United States Patent
Clements

(10) Patent No.: US 6,447,262 B1
(45) Date of Patent: Sep. 10, 2002

(54) PUMPING SYSTEM FOR A MULTI-STAGE PUMP

(75) Inventor: Martin A. Clements, North Royalton, OH (US)

(73) Assignee: Argo-Tech Corporation, Cleveland, OH (US)

( * ) Notice: Subject to any disclaimer, the term of this patent is extended or adjusted under 35 U.S.C. 154(b) by 0 days.

(21) Appl. No.: 09/567,885

(22) Filed: May 10, 2000

Related U.S. Application Data

(60) Provisional application No. 60/134,271, filed on May 14, 1999.

(51) Int. Cl.[7] ............................................. F04B 25/00
(52) U.S. Cl. ....................... 417/251; 417/244; 417/250; 417/286
(58) Field of Search .................................. 417/251, 250, 417/252, 253, 244, 245, 286

(56) References Cited

U.S. PATENT DOCUMENTS

| | | | | |
|---|---|---|---|---|
| 3,614,269 A | * | 10/1971 | Lanctot | 417/253 |
| 3,826,586 A | * | 7/1974 | Richards | 415/42 |
| 4,205,945 A | * | 6/1980 | Davis | 417/53 |
| 4,664,592 A | | 5/1987 | Grzina | |
| 4,700,680 A | * | 10/1987 | Pearce | 123/383 |
| 4,720,242 A | | 1/1988 | Lovisetto | |
| 4,864,815 A | * | 9/1989 | Cygnor | 60/39.141 |
| 5,064,357 A | * | 11/1991 | Smith | 417/428 |
| 5,082,425 A | | 1/1992 | Reil et al. | |
| 5,431,545 A | * | 7/1995 | Knight et al. | 417/248 |
| 6,022,197 A | * | 2/2000 | Cygnor et al. | 417/203 |

* cited by examiner

Primary Examiner—Charles G. Freay
Assistant Examiner—Han Lieh Liu
(74) Attorney, Agent, or Firm—Fay, Sharpe, Fagan, Minnich & McKee, LLP

(57) ABSTRACT

A pumping system for selectively activating the stages of a multi-stage centrifugal pump is provided. The pumping system has a first stage impeller for receiving fluid into the system and imparting rotational energy into the fluid. The system also has a second stage impeller for centrifugally imparting additional rotational energy into the fluid after the first stage impeller. A valve selectively closes an inlet to the second stage impeller so that the system operates as a single stage centrifugal pump while the second stage impeller remains wetted.

14 Claims, 1 Drawing Sheet

PUMPING SYSTEM FOR A MULTI-STAGE PUMP

This application claims the benefit of U.S. Provisional Application Ser. No. 60/134,271, filed on May 14, 1999.

BACKGROUND OF THE INVENTION

1. Field of the Invention

The present invention relates to centrifugal pumps, and more particularly, to an improved pumping system for a multi-stage centrifugal pump. The present invention finds particular application in conjunction with an aircraft fuel pump, and it will be described with particular reference thereto. However, it will be appreciated that the present invention is also amenable to other like applications.

2. Discussion of the Art

Centrifugal pumps generally include at least one impeller which rotates within a casing or housing. A motor rotates the impeller via a shaft which operatively connects the motor to the impeller. Fluid is provided to the impeller through, for example, a centrally disposed inlet located on one or both faces of the impeller. Fluid enters the impeller inlet in an axial direction and, due to the rotation of the impeller, flows radially outwardly. Finally, the fluid discharges from the impeller along a peripheral edge of the impeller. Meanwhile, the fluid flowing outwardly from the impeller creates a suction at the central inlet of the impeller which serves to continuously draw more fluid into the inlet.

The fluid discharged from the impeller exits at a significantly higher pressure than the fluid entering the impeller. The major portion of the energy imparted to the fluid is converted to a pressure head by means of a volute, diffuser, or other system. When high fluid pressures are desired, multi-stage centrifugal pumps are often employed. In a multi-stage pump, the fluid through the pump proceeds through successive centrifugal processes or stages. In each stage, the fluid enters an impeller and is centrifugally forced radially outwardly as described above. Each stage incrementally imparts rotational energy into the fluid thereby successively increasing the pressure of the fluid.

Aircraft engines are an application where high fuel pressures are required. However, the fuel is often required to be delivered at a high pressure for only a short period of time. During the majority of the operation of the pump, fuel is only required to be delivered at a low pressure. Heretofore, multi-stage pumps were used for the delivery of fuel during both of these peak and off-peak periods with little or no means to selectively deactivate the stages of the pump. As a result, large losses in pump efficiency occurred.

Thus, it is desirable to provide a multi-stage pump whereby each stage may be selectively actuated and deactuated. Such a pump would allow all stages of a multi-stage pump to be activated when high pressure is required and less stages when low pressure will suffice. The present invention contemplates such an invention.

BRIEF SUMMARY OF THE INVENTION

In accordance with the present invention, an improved multi-stage centrifugal pumping system is provided for minimizing the above-referenced and other disadvantages of the prior art, and in particular, for minimizing losses due to the use of multi-stage centrifugal pumps in applications where the fluid pressure requirements fluctuate over relatively short periods of time.

In accordance with one aspect of the present invention, a pumping system for selectively activating the stages of a multi-stage centrifugal pump is provided. The pumping system has a first stage impeller for receiving fluid into the system and imparting rotational energy into the fluid. The system also has a second stage impeller for imparting additional rotational energy into the fluid after the first stage impeller. The system includes a valve for selectively opening and closing an inlet to the second stage impeller.

The valve includes a first inlet in fluid communication with the first stage impeller, a first outlet in fluid communication with the inlet of the second stage impeller, a second inlet in fluid communication with an outlet from the second stage impeller, and a second outlet allowing fluid to exit the pumping system. The valve is selectively actuated between first and second positions. In the first position of the valve fluid exiting the first stage impeller enters the second stage impeller. The second position of the valve prevents fluid from entering the second stage impeller.

In the second position the valve allows fluid to flow toward the outlet of the second stage impeller and to exit the valve through the second outlet. Additionally, in the second position the valve causes fluid to flow toward the outlet of the second stage impeller and prevents fluid from flowing toward the inlet of the second stage impeller which causes the impeller to become free wheeling and have a zero flow rate.

One advantage of the present invention is that it eliminates or substantially reduces losses due to fluctuating fluid pressure requirements.

Further advantages and benefits of the present invention will become apparent to those of ordinary skill in the art upon reading and understanding the following detailed description of the preferred embodiment.

BRIEF DESCRIPTION OF THE DRAWINGS

The structure, operation and advantages of the presently preferred embodiment of this invention will become further apparent upon consideration of the following description, taken in conjunction with the accompanying drawing. Of course, the drawing is only for purposes of illustrating a preferred embodiment and is not to be construed as limiting the invention.

DETAILED DESCRIPTION OF THE INVENTION

Figure 1:
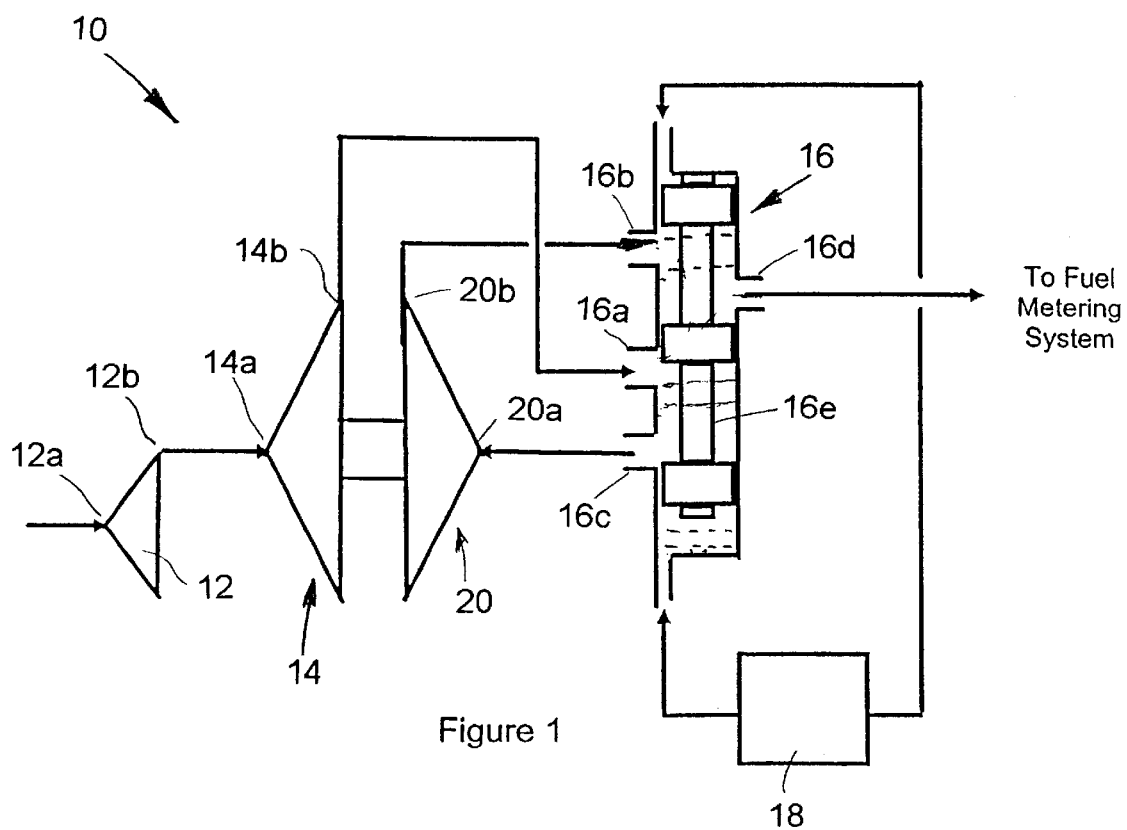
FIG. 1 is a pumping system schematic illustrating a multi-stage centrifugal pump system in accordance with the present invention.

With reference to FIG. 1, a pumping system schematic is indicated generally by reference numeral 10. Fluid is provided to an inducer 12, particularly at inlet 12a, as is well known. The fluid exits the inducer at outlet 12b and is directed to an inlet 14a of a first stage impeller 14 of a centrifugal pump. Fluid axially enters the first stage impeller 14 where rotational energy is imparted to the fluid increasing the pressure of the fluid. The fluid then radially exits the first stage impeller through a first stage impeller outlet 14b. From the outlet 14b, the fluid is directed to a mode transition valve assembly 16.

The mode transition valve 16 includes a first inlet 16a, a second inlet 16b, a first outlet 16c, and a second outlet 16d. A valve member 16e is selectively movable between at least two positions. A valve actuator, such as solenoid valve 18 actuates or toggles the valve member 16 between the first and second positions.

In the first position of the valve member, the first inlet 16a is in fluid communication with the first outlet 16c. This establishes fluid communication between the outlet 14b of the first impeller stage and an inlet 20a of a second stage impeller 20. In addition, the second inlet 16b is in fluid communication with the second outlet 16d in the first position of the valve member. This establishes fluid communication between an outlet 20b of the second stage impeller 20 and a downstream fuel metering system (not shown).

Thus, when the valve member 16 is in the first position, fluid exits the first stage impeller 14, passes through the valve 16, and enters the second stage impeller 20. The second stage impeller 20 imparts additional rotational energy to the fluid so that the fluid exiting the second stage impeller has an increased pressure. After exiting the second stage impeller, the fluid passes through the valve 16 again and flows from the pump for external use. Consequently, when the valve member 16 is in the first position, fluid passing through the pumping system 10 undergoes two successive centrifugal pump stages with each stage incrementally increasing the pressure of the fluid.

In a second position of the valve member 16e (shown in dotted line), the first inlet 16a is in fluid communication with both the second inlet 16b and the second outlet 16d, while the first outlet 16c is effectively sealed off. When the valve member is in the second position, the fluid entering the valve assembly from the first stage impeller 14 is precluded from entering the second stage impeller inlet 20a. Instead, the fluid from the first stage impeller exits the valve assembly through the second port 16b toward the outlet 20b of the second stage impeller 20 and through the second outlet 16d to the fuel metering system. The fluid flowing toward the outlet 20b of the second stage impeller 20 provides a back pressure that effectively deactivates the second stage impeller 20. In essence, the second stage impeller 20 becomes a free wheeling impeller running at a zero flow condition because the inlet 20a is closed off.

A simple, effective switch is provided to selectively actuate and deactivate the second stage impeller from the system. This allows the pumping system to provide low pressure flow from the first stage impeller during the non-peak operation and an increased pressure (from serially passing through both the first and second stages) upon demand. The second stage impeller remains wetted in accordance with this apparatus and method since the fluid from the first stage impeller communicates with the outlet of the second stage impeller when the valve assembly is in the second position. The fluid circuit and actuator provide a low cost system that allows the operator to conveniently switch the valve assembly between the first and second positions without any delay in start-up as encountered in prior systems. Power output is effectively reduced, when it is not required, and can be easily transitioned to a higher level when desired.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A pumping system for selectively activating the stages of a multi-stage centrifugal pump, the pumping system comprising:
   a first stage impeller for receiving fluid into the system and imparting rotational energy into the fluid;
   a second stage impeller for imparting additional rotational energy into the fluid after the fluid has passed through the first stage impeller; and
   a valve for selectively closing an inlet to the second stage impeller from the first stage impeller.

2. A pumping system for selectively activating the stages of a multi-stage centrifugal pump, the pumping system comprising:
   a first stage impeller for receiving fluid into the system and imparting rotational energy into the fluid;
   a second stage impeller for imparting additional rotational energy into the fluid after the fluid has passed through the first stage impeller; and
   a valve for selectively closing an inlet to the second stage impeller from the first stage impeller, wherein the valve includes a first inlet in fluid communication with the first stage impeller, a first outlet in fluid communication with the inlet of the second stage impeller, a second inlet in fluid communication with an outlet from the second stage impeller, and a second outlet allowing fluid to exit the pumping system.

3. The pumping system of claim 2 wherein the valve is selectively actuated between first and second positions, the first position directing fluid exiting the first stage impeller to enter the second stage impeller, and the second position preventing fluid from entering the second stage impeller.

4. The pumping system of claim 3 wherein the valve in the second position allows fluid to flow toward the outlet of the second stage impeller and to exit the valve through the second outlet.

5. The pumping system of claim 4 wherein the valve in the second position causes fluid to flow toward the outlet of the second stage impeller and prevents fluid from flowing toward the inlet of the second stage impeller which causes the impeller to become free wheeling and have a zero flow rate.

6. The pumping system of claim 4 wherein the valve in the second position causes fluid to flow toward the outlet of the second stage impeller which keeps fluid in the second impeller stage until activation of the second impeller stage.

7. A method of supplying fuel to an aircraft engine where the fuel is selectively provided at different pressures, the method comprising the steps of:
   providing fuel to a first stage impeller;
   directing the fuel exiting the first stage impeller to a mode transition valve, the mode transition valve serving to selectively activate and deactivate a second impeller stage and allowing fluid to flow toward the aircraft engine;
   selectively switching the mode transition valve between first and second positions;
   directing the fuel from the first stage impeller through the mode transition valve to a second stage impeller when the mode transition valve is in a first position;
   directing the fuel exiting the second stage impeller through the mode transition valve to a valve exit which is in fluid communication with the aircraft engine when the mode transition valve is in a first position; and
   directing fuel from the first stage impeller to both the discharge side of the second impeller stage and the valve exit when the mode transition valve is in a second position.

8. The method of claim 7 comprising the further step of maintaining fuel in the second impeller stage to prevent dry start-up when the second impeller stage is activated by moving the valve to the first position.

9. A method of pumping fluid through a multi-stage pump wherein the stages of the pump are selectively activated, the method comprising the steps of:

provacing fluid to a first stage inlet for a first pumping stage;

increasing the pressure of the fluid in the first pumping stage;

selectively providing fluid exiting a first stage outlet of the first stage to a second stage inlet of a second pumping stage;

increasing the pressure of the fluid selectively provided to the second pumping stage;

providing the fluid exiting a second stage outlet of the second stage to a pump outlet when fluid is selectively provided to the second stage;

selectively providing fluid exiting the first stage outlet of the first stage to the pump outlet; and precluding fluid exiting the first stage outlet from communicating with the second stage inlet when fluid exiting the first stage outlet is selectively provided to the pump outlet.

10. The method of claim 9 comprising the further steps of selectively switching fluid from the first stage to flow directly to the second stage, precluding flow to the second stage, and allowing fluid to flow to the pump outlet and toward the second stage outlet.

11. The method of claim 10 comprising the further steps of deactivating the second stage while maintaining fluid flow to the second stage outlet.

12. The method of selectively switching a pump between a one-stage pump and a two-stage pump, the method comprising the steps of:

providing fluid to a pumping system where the pumping system includes first and second impeller stages and a mode transition valve;

using the mode transition valve to selectively activate and deactivate the second impeller stage; and maintaining fluid throughout the second impeller stage during deactivation of the second impeller stage.

13. A pumping system, comprising:

a first impeller stage for importing rotational energy into a fluid;

a second impeller stage for further importing rotational energy into the fluid;

a valve assembly for selectively controlling fluid communication between the first and second impeller stages and a pump outlet;

wherein the valve assembly has a first mode that permits fluid communication between an outlet of the first impeller stage and an inlet of the second impeller stage and between an outlet of the second impeller stage and the pump outlet; and wherein the valve assembly has a second mode that prevents fluid communication between the outlet of the first impeller stage and the inlet of the second impeller stage and permits fluid communication between the outlet of the first impeller stage and the pump outlet.

14. The pumping system of claim 13, wherein the second mode further permits fluid communication between the outlet of the first impeller stage and the outlet of the second impeller stage.

* * * * *